Sept. 21, 1965     B. C. DAVIS ETAL     3,207,884
WELDING APPARATUS
Filed Aug. 14, 1963     4 Sheets-Sheet 1
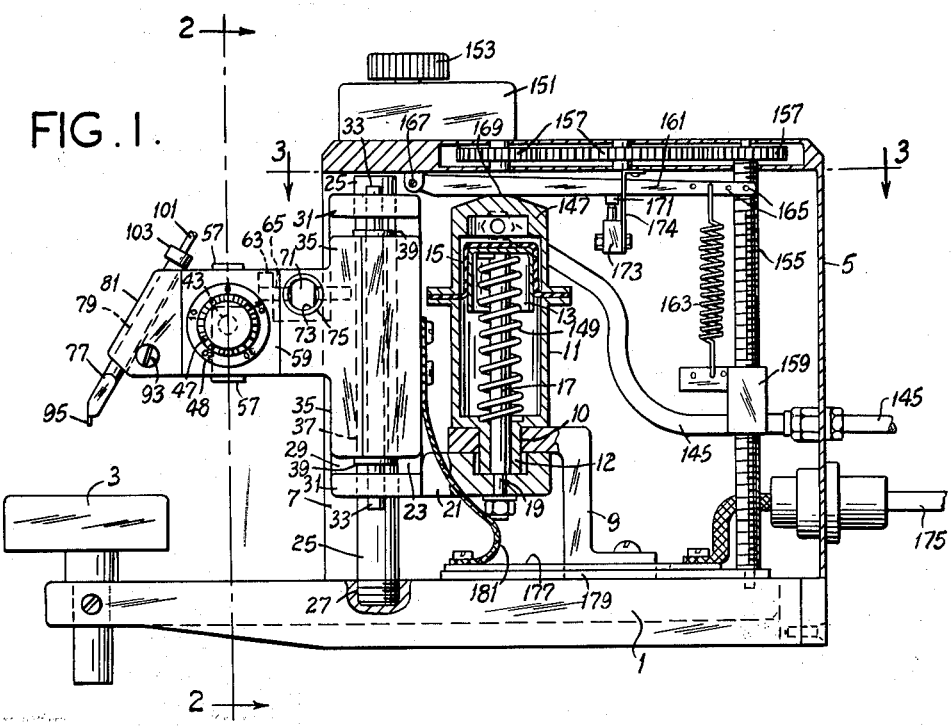
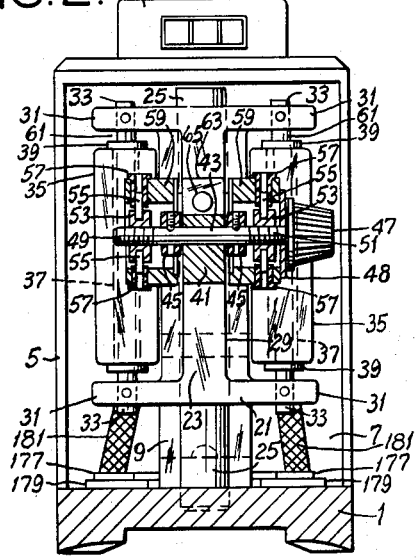
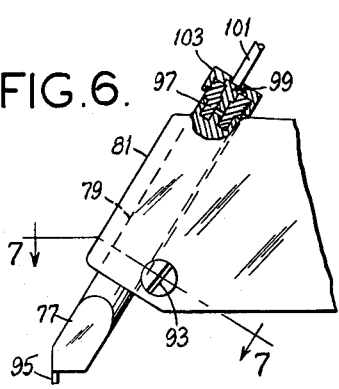
Billy C. Davis,
John D. Helms,
Inventors.
Koenig, Senniger, Powers and Leavitt,
Attorneys.

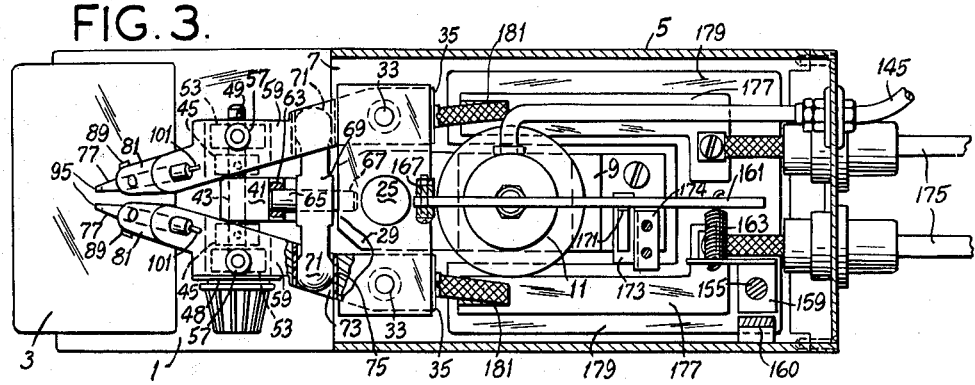

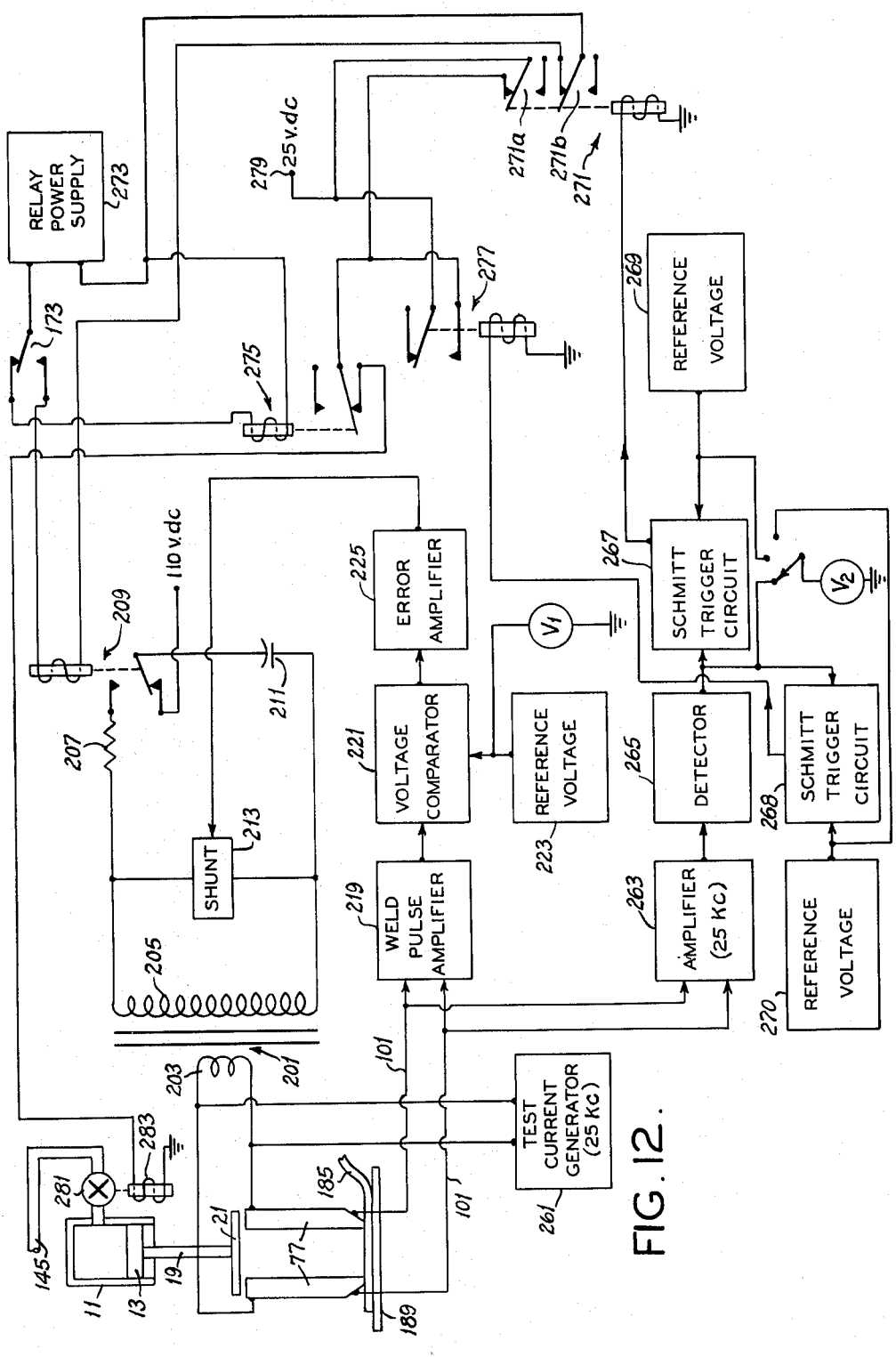

United States Patent Office 3,207,884  
Patented Sept. 21, 1965

3,207,884  
WELDING APPARATUS  
Billy C. Davis and John D. Helms, Dallas, Tex., assignors to Texas Instruments Incorporated, Dallas, Tex., a corporation of Delaware  
Filed Aug. 14, 1963, Ser. No. 303,212  
7 Claims. (Cl. 219—89)

This invention relates to welding apparatus, and more particularly to welding apparatus adapted among other uses to weld the leads of microminiature electronic components such as semiconductor networks and the like to the conductive portions of printed circuit boards.

Among the several objects of the invention may be noted the provision of a parallel-gap welder which facilitates the application and interconnection of microminiature electronic circuit components to printed circuit boards; the provision of welding apparatus having improved mechanical and electrical characteristics which make possible the welding of very fine conductive leads or wires to thin conductive portions on a nonconducting substrate of glass, ceramic, epoxy, or the like, without damaging the leads, said conducting surface portions, or the substrate; the provision of welding apparatus of the class described wherein the welding current through the workpiece being welded is accurately controlled during a welding cycle; the provision of a conveniently operable welder mechanism adapted to apply replaceable electrodes to the work at selectively predetermined equal operating pressures; the provision of a mechanism of the class described which will effectively apply its electrodes to coplanar or noncoplanar surfaces; the provision of such a mechanism including means for preventing excess contact pressure of the electrodes; the provision of welding apparatus wherein the gap between the weld electrodes insures that the welding area is clearly visible during a welding cycle, and wherein ease of access to the work beneath the electrodes is maintained during the cycle; the provision of apparatus of the class described wherein parallel electrode tips are employed, eliminating the necessity of realignment due to electrode wear; and the provision of welding apparatus wherein the quality of the weld joint is accurately controlled and wherein the weld process can be easily automated. Other objects and features will be in part apparent and in part pointed out hereinafter.

The invention accordingly comprises the constructions and circuits hereinafter described, the scope of the invention being indicated in the following claims.

In the accompanying drawings in which two of various possible embodiments of the invention are illustrated, FIGURE 1 is a diagrammatic side elevation of certain mechanical elements of the invention, parts being broken away and shown in section;

FIGURE 2 is a vertical section taken on line 2—2 of FIGURE 1;

FIGURE 3 is a horizontal section taken on line 3—3 of FIGURE 1;

FIGURE 4 is an enlarged view of certain parts of FIGURE 2;

FIGURE 5 is a cross section illustrating certain pedal-operating means;

FIGURE 6 is an enlarged side elevation of an electrode and its support, parts being shown in section;

FIGURE 7 is a section taken on line 7—7 of FIGURE 6;

FIGURE 8 is a front view of a pair of electrodes shown as being applied to coplanar welding areas;

FIGURE 9 is a front view of a pair of electrodes shown as being applied to noncoplanar welding areas;

FIGURE 12 is a block diagram illustrating a second control system for the welding apparatus of FIGURES 1–9, mechanical portions of the system being shown diagrammatically.

Corresponding reference characters indicate corresponding parts throughout the several views of the drawings.

Figure 10:
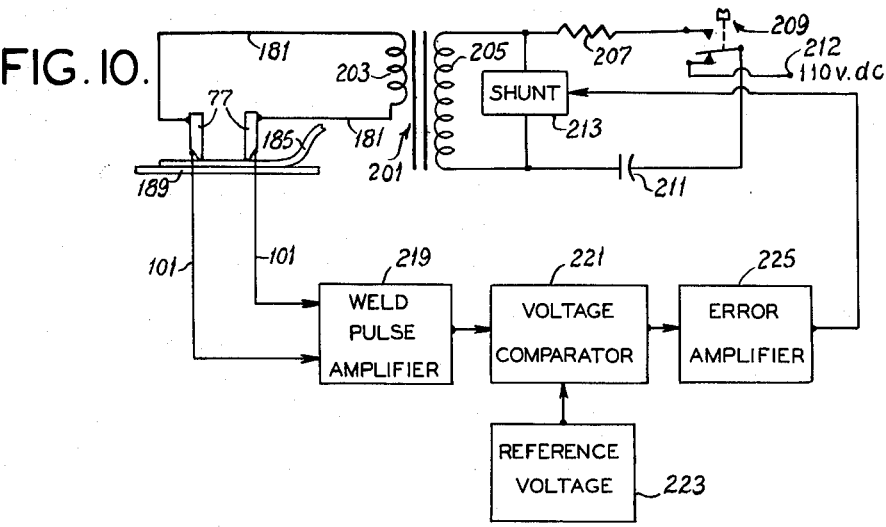
FIGURE 10 is a block diagram illustrating a preferred electrical control system for the welding apparatus of FIGURES 1–9.

Referring now more particularly to FIGURE 1, there is shown at numeral 1 a base which carries a suitable work-table or insulated welding platform 3 for supporting work to be welded. On the base 1 is a housing 5, open at the front, as shown at 7. On the base 1 is a bracket 9 which supports a movable hydraulic cylinder 11. Support is effected by a sliding fit between a hole 10 in the bracket 9 and a downward cylindrical extension 12 of the cylinder 11.

In the cylinder 11 is a movable piston 13 which is sealed during movements by a flexible diaphragm or plunger 15 marginally held by the cylinder. Carried on the piston 13 is a piston rod 17. This passes through the lower extension of the cylinder 11. At its outer end rod 17 is attached at 19 to a vertically movable bracket 21. Bracket 21 forms part of a carrier member 23 which is vertically bored to receive a post 25 for vertical sliding movement thereon. The post 25 is affixed to the base 1, as indicated by the threaded attachment 27.

The sliding carrier member 23 has a forwardly extending central rib 29. At the upper and lower ends of carrier 23 are located transverse flanges 31. Affixed between the flanges 31 are guide means in the form of fixed vertical rods 33. Slidable for a limited distance on each rod 33 is a sleeve 35. Within each sleeve 35 is an electrically insulating bushing 37, flanged at its opposite ends, as shown at 39.

Extending forward from the rib portion 29 is a bracket 41 which supports a rotatable crosspin 43 (FIGURES 2 and 4). The pin 43 is held captive axially by set screw collars 45. It carries a calibrating knob 47. Under the knob is a calibration dial 48 which is attached to one of a pair of arms 59 (further to be described below).

The pin 43 carries threads 49 and 51 at its opposite ends. These are of opposite pitches and carry nuts 53. The arrangement is such that when the pin 43 is turned, the nuts 53 will recede or approach relative to one another, depending upon the direction in which the knob 47 is turned. Attached to and extending up and down from each nut 53 is a pair of collinear pins 55 which have slidable engagement with insulating bushings 57. The bushings 57 are located in arms 59, which extend forwardly from the vertically movable members 35 respectively. The purpose of this arrangement is to permit two types of movement for the arms 59; first, opposite transverse swinging arm movements around the centers of the guide rods 33, so that welding rods (to be described) may have the space between them adjusted by turning knob 47; and second, opposite vertical movements of the arms 59 (with the sleeves 35 from which they extend) so that compensations can be effected in the contact planes of said welding rods.

The amount that the sleeves 35 of the arms 59 may move up and down on their pins 33 is determined by the clearances shown at 61 (FIGURES 1 and 2).

Extending up from the bracket 41 is a lug 63 forming a bearing for one end of a rocker pin 65. The other end of this pin is borne in a hole 67 in the rib 29 of carrier 23. Rotatable on pin 65 is a compensating beam or lever 69 which has a rounded head 71 at each end. Each head 71 is located in an opening 73 of one of the arms 59. Insulating bushings 75 in the openings 73 surround the heads 71. If desired, instead of employing insulating bushings 75, the beam 69 might be made of insulating material.

At numerals 77 are shown the welding rods or electrodes (above mentioned), each of which is located in an opening 79 of a downwardly directed finger part 81 of an arm 59 (FIGURES 1, 3, 6 and 7). In FIGURE 7 is shown one of the clamping means such as used for holding each welding rod 77. This consists of a ball 83 held loosely but captive in a suitable cage 85 located in finger 81. For assembly purposes, an opening 87 is provided extending across rod opening 79, for the introduction of the cage 85. Before the cage and ball are introduced, a wedging member 89 of hour-glass shape is threaded into an opening 91 extending crosswise of the finger part 81. This wedging member 89 contains a screw-driver slot 93, whereby it may be rotated so as to wedge the ball 83 into holding contact with a welding rod 77 in opening 79. It will be understood that other appropriate means may be used for clamping the electrodes in position in their respective arm portions 81.

The lower end of each electrode has a welding tip 95 (FIGURES 6, 8 and 9). The opposed faces or surfaces of electrodes 77 are parallel (see FIGURES 8 and 9) so that the tips 95 are parallel. This eliminates the necessity of realignment of the electrodes due to electrode wear. At its upper end each electrode carries an exteriorly threaded socket member 97 for the reception of a jack 99 forming the end of a lead wire 101. The jack 99 is held in place by a cap 103, threaded to the socket member 97. The purpose of wire 101 will be described below.

In FIGURE 5 is shown pedal-operating means, comprising a base 105 to which at 107 is pivoted a foot pedal 109. Foot pedal 109 carries a bracket 111 forming a guide for a slider member 113. The position of the slider is controlled by an adjusting screw 115. Pivoted at 117 to the slider 113 is a piston rod 119. This is connected with the plunger 121 located in a flexible sealing bellows 123 in a hydraulic cylinder 125. The plunger 121 and bellows form a piston in the cylinder 125, operable by the piston rod 119 when the pedal 109 is rotated clockwise. By adjusting the slider 113 on the bracket 111, the position of pivot 117 relative to the pedal 109 is changed and by this means the stroke of the plunger may be changed, as desired.

The cylinder 125 has a rigid extension 127 pivoted at 129 to a bell crank 131. The bell crank is pivoted at 133 to an appropriate support 135 on the base 105 and engages a plunger 137, backed by an overload spring 139. The purpose of the plunger 137 and spring 139 is to provide a release of the bell crank 131 when hydraulic pressure in a cylinder 125 approaches that corresponding to a selected safe limit. The motion of the pedal 109 is also limited by adjustable stops 141 and 143.

A flexible hydraulic pressure line 145 leads from the cylinder 125 to the head 147 of cylinder 11 (FIGURES 1, 3 and 5). Thus when the pedal 109 is rotated cross wise (FIGURE 5) hydraulic pressure is introduced into the cylinder 11 so as to push down the piston rod 17, bracket 21 and carrier parts connected therewith. Return of fluid to cylinder 125 is provided for by return action on piston 13 of a spring 149 when foot pressure is taken from the pedal 109.

Referring again to FIGURES 1 and 3, the top of the housing 5 carries a motion transmission box 151 operative between a calibrated dial 153 and a gear train 157 for turning a threaded vertical post 155. On the post is a nut 159 which is vertically movable when the post 155 is turned. An elongate bracket 160 (shown in FIGURE 3) prevents the nut from turning while permitting its axial movement (FIGURE 3). The nut is coupled to a lever 161 through a tension spring 163, adapted to be hooked into various holes 165 of the lever 161. The lever is pivoted at 167 to the top of the housing 5 and is engaged on its underside at 169 by the head portion 147 of the cylinder 11. The lever also carries a lug 171, engageable with the operating button of a normally open firing switch 173. This switch is carried from the top of the housing 5 by a bracket 174. By turning the calibrated knob 153 and thus adjusting the elevation of the nut 159, various clockwise movements of force may be obtained on the lever 161 from spring 163.

At numerals 175 are shown welding-current leads which extend to bus bars 177 carried on an insulated plate 179 located on base 1. Flexible current leads 181 extend from the bus bars 177 to the sleeves 35, whereby current from a capacitor-discharge type power supply (described hereinafter) is conducted through arms 59 to the welding rods or electrodes 77.

As noted above, the welding apparatus of this invention is adapted among other uses to weld the leads of microminiature electronic components such as semiconductor networks (SCN) or integrated modules to the conductive portions or plating of printed circuit boards. In describing the operating of the mechanical portion of the apparatus, it will be assumed that this workpiece, i.e., the printed circuit board, and the SCN are in proper position on table 3. These are shown in FIGURES 8 and 9, the SCN (or a portion thereof) at reference numeral 183 and its conductive lead at 185. The conductive portion or plating of a printed circuit board (indicated at 187) is shown at numeral 189, and the nonconducting substrate thereof is indicated at numeral 191.

Operation of the mechanical portion of the apparatus is as follows:

The calibrating knob 47 is turned, thus driving the nuts 53 on threaded crosspin 43 either together or apart. This swings the carriers 35 oppositely around the rods 33, whereby the desired distance is obtained between the welding tips 95. The calibration at the knob 47 indicates these distances which may be in the range of 0 to 40 mils.

Next, foot pressure on pedal 109 rotates it clockwise, which squeezes fluid under pressure out of the cylinder 125 through line 145 to the head 147 of cylinder 11. Since at this times the electrodes do not contact their work, the piston 13 responds by moving downwardly more or less freely, although against return action of the spring 149. This moves the bracket 21 down along with the assembly of parts 23, 31 and 41. These slide down on the post 25. This moves down the bracket 41 and its lug 63 which in turn carries down the pin 65. Pin 65 carries down with it the compensating lever or beam 69 which in turn carries down the sleeve 35, arms 59, fingers 81 and welding rods 77. Before any contact is made by electrodes 77 with the work, the two carriers 35 may or may not remain at about the same level on their posts 33, as shown in FIGURE 2. If the electrodes 77 make contact with the work in one plane, as shown in FIGURE 8, they remain or seek a level. If they contact the work in different planes, then the state of affairs shown in FIGURE 9 occurs. In this case one (the right-hand) carrier 35 stops. Then as the parts descend further, the compensating beam 69 rocks, forcing down the other carrier 35 and taking with it the left-hand electrode 77. It will be apparent that the sliding fits of the pins 55 of nuts 53 in the bushings 57 in arms 59 allow for compensating action between the arms 59 and the space-adjusting crosspin 43, as required. In any event, when the electrodes 77 make contact with the work, they exert equal pressures, either as shown in FIGURE 8 or FIGURE 9. Moreover, a reaction will be set up by them through the compensating beam 69 to the parts which slide on the post 25. These parts, as above noted, include the bracket 21. As a consequence the pressure in the cylinder 11 cannot push the piston 13 down any further. Pressure on the head 147 continues. Thereupon the cylinder 11 is pulled up, its part 12 sliding in the hole 10 of the bracket 9. At this time the parts connected with bracket 21 do not move, pressure on the work being maintained by the welding tips 95. Since the cylinder head 147 engages under the lever arm 161 at 169, this tends to rotate the arm anticlockwise against the adjusted tension of the spring 163.

Ultimately the lug 171 causes firing switch 173 to close. As explained hereinafter, this actuates a relay which in turn causes a capacitor to be discharged through the leads 175, the electrodes 77 and the work. A pulse of welding current passes from one of the welding electrodes 77 to the other through the parallel branches or conductive paths formed by the SCN lead 185 and the conductive portion or welding tab 189 of the printed circuit board. As explained hereinafter, the peak amplitude of the pulse voltage is accurately controlled during the weld cycle so as not to exceed a preestablishd level. This is an important feature used with our invention, as will be described in connection with FIGURES 10–12.

Because, with voltage control of the welding pulse, there is a constant and equal voltage across the two parallel paths, 185 and 189, the power dissipation in each path is an inverse function of its resistance. The most significant results of this relationship are that the power dissipated in a conductor to be welded is a direct function of its cross section, and any sudden increase in the resistance of parallel circuit 185 and 189 will not result in a catastrophic failure as would be the case were a constant current source being used. The weld joint thus formed does not extend over the full width of the gap due to the heatsink action of the electrodes. The high thermal conductivity of these electrodes (which are preferably made of copper) limits fusion to approximately 80% of the electrode gap. This heatsink effect is desirable because it eliminates fusion near the electrode tips which otherwise would result in the tips sticking to the welded surface.

Since switch 173 is actuated at a preselected pressure between the electrode tips and the workpiece, a high uniformity of welds may be attained. Acceptable welds joining SCN networks to so-called G–11 base printed circuitry have been made over a total pressure range from 1.5 to 3.5 pounds. By total pressure is meant the sum of the pressure exerted by the electrode tips. This wide range of acceptable pressures is possible because the weld is formed between the electrodes instead of beneath the electrodes. In any specific application, the only limits imposed on the electrode pressure are (1) the total pressure must be sufficient to break down surface oxidation between the network lead and the welding tab, and (2) this pressure must be less than a value which would tend to weaken the bond between the welding tab and the substrate.

The electrode gap (defined as the horizontal distance between the interfaces of the two electrode tips) is a critical parameter in obtaining optimum weld joints. The electrode gap controls the mass of fusion nugget formed by the welding current pulse, large gaps resulting in the formation of large nuggets. The higher energies required to form large nuggets burn the board beneath the tab and weaken the organic bond between the substrate and the plating; while gaps which are too small result in a joint which is mechanically weak, due to incomplete fusion. Different applications will require different gap settings, and the accurate control of the gap by means of knob 47 and its associated components constitutes an important feature of this invention.

After firing, the pedal 109 is permitted to return anticlockwise to its initial position, as shown in FIGURE 5. The spring 149 then expands, thereby returning cylinder 11 to its initial position and causing the piston rod 17 to lift bracket 21 and the parts including the electrodes to their elevated positions away from the work. In the process, fluid flows back through the line 145 to the cylinder 125. In view of the above, it will be apparent that the sealed piston 13 and cylinder 147 constitute expansible fluid chamber means having relatively movable parts, one of which (the piston) is connected to the electrode carrier means to move the electrodes to and against the work. The other part (head 147) is articulated to the lever or arm 161 which provides adjustable reaction (from spring 163) to determine the electrode contact pressure at the instant of welding.

Figure 11:
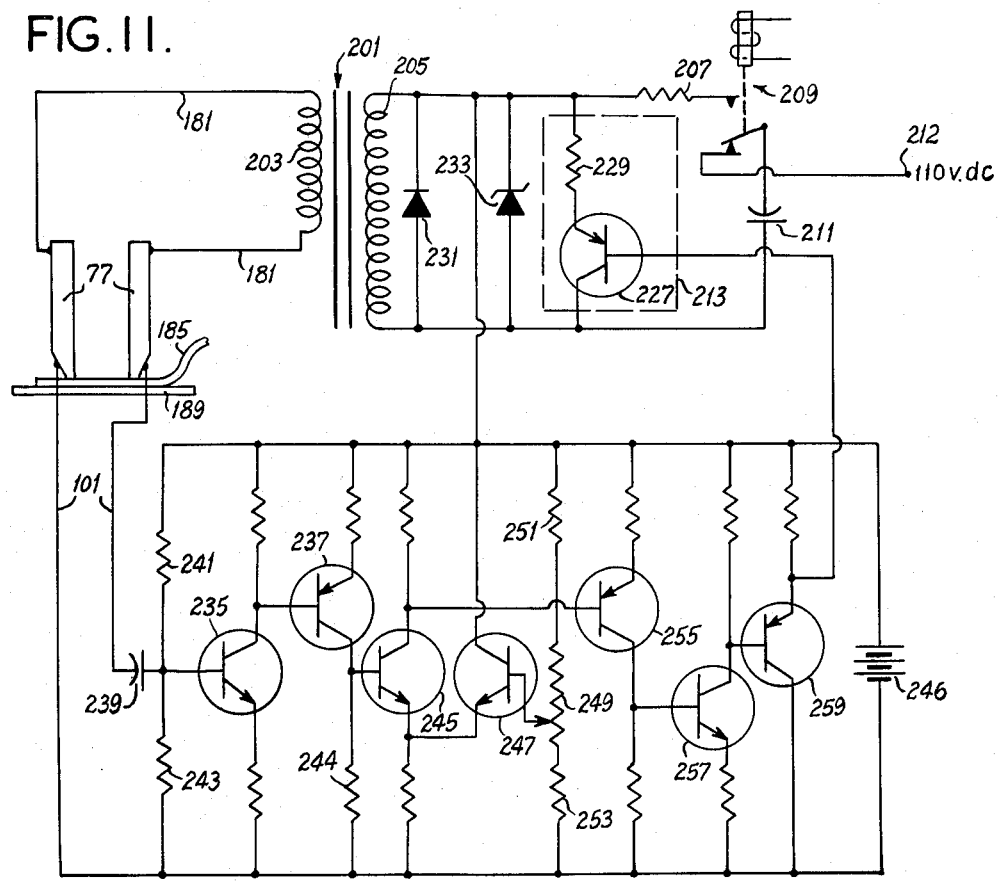
FIGURE 11 is a circuit diagram illustrating the electrical components of the FIGURE 10 system and their interconnection.

A preferred embodiment of the electrical control portion of the welding apparatus which functions to provide selective energization of the weld electrodes and critical regulation of the current pulse through the workpiece during a welding cycle will now be considered in connection with FIGURES 10 and 11. Referring now to FIGURE 10, weld electrodes 77 are shown in contact with lead 185 which is to be welded to the tab or surface 189. The flexible leads 181 are shown interconnected to the electrodes 77. These supply power from a capacitor-discharge type power supply consisting of a welding transformer 201 having a primary winding 205 and a secondary winding 203, a regulating resistance 207, a welding relay 209 (which, as explained hereinafter, is under the control of firing switch 173), and a capacitor 211. The latter is selectively connected by relay 209 to a source of charging current, for example a 100 v. D.C. power supply connected at point 212. A shunt 213, which, as explained hereinafter, consists of a variable and controlled impedance in the form of one or more transistors, is connected in series with resistor 207, and in parallel with primary winding 205.

In the quiescent state, the movable contact of relay 209 is in the position illustrated wherein it interconnects the D.C. power supply with capacitor 211, charging the latter to the 110 v. level. Actuation of firing switch 173 causes energization of relay 209 which in turn connects capacitor 211 to resistor 207 thereby providing a discharge path for this capacitor through resistance 207, and through primary winding 205 and shunt 213. The pulse through winding 205 is coupled to secondary winding 203 and applied to electrodes 77. A typical pulse applied across the workpiece will have an amplitude of from .5 to .75 v., for example, and a duration of 2–3 milliseconds.

Because the impedance between electrodes 77 when they are not in contact with the workpiece is considerably higher than the resistance of the workpiece between electrodes 77, and since the latter is quite low, for example, 3 milliohms, the capacitor-discharge power supply is essentially a constant-current source for small changes in the resistance of the workpiece. Because of this, the heat generated during the welding cycle (which is equal or proportional to $I^2R$) varies with the resistance of the workpiece. And the thinner workpieces which are less able to stand increased heat have higher resistances resulting in higher $I^2R$ heat generation. For example, if a lead having a thickness of 4 mils has a resistance of 3 milliohms, a 2-mil lead would have a resistance of 6 milliohms; and the lead having half the volume would in effect receive double the heat input. The present invention obviates or overcomes the burn-out problem by including a feedback circuit which provides a dynamic control during a welding cycle which maintains the voltage across the workpiece, and hence the current therethrough, at a value less than a preestablished safe level. In this controlled feedback system, the lead receives heat in proportion to its volume because this system sets the voltage level across the tips as the weld is taking place.

This feedback circuit includes a pulse weld amplifier 219, the input of which is connected by conductors 101 to the welding electrodes 77. As shown most clearly in FIGURE 1, conductors 101 are connected directly to the weld electrodes immediately adjacent the workpiece.

This is an important feature of the present invention which increases or enhances the signal-to-noise characteristics by reducing the total D.C. resistance between the sensing conductors 101. Pulse weld amplifier 219 is a D.C. coupled amplifier having a gain of approximately 6 to 10. This amplifier functions to bring the weld pulse up from an increment of .5 v. to from 3 to 5 v. The output of amplifier 219 is applied to one input of a voltage comparator or differential amplifier 221, the other input of which receives a reference voltage from a reference voltage generator 223. An output of comparator 221 occurs when the input from amplifier 219 exceeds the reference voltage supplied by generator 223, with the amplitude of the output being a function of the difference between the two inputs. The output of comparator 221 (when one occurs) is fed to an error amplifier 225 which in turn controls the value of the shunt impedance 213 to bring the weld pulse back to its proper value. It will be appreciated that regulating resistor 207 and shunt 213 constitute a voltage divider network, the output of which (applied to primary winding 205) is taken across shunt 213.

A sequence of operation of the FIGURE 10 control is as follows: Initially relay 209 is deenergized, and the movable contact thereof interconnects capacitor 211 with point 212 causing this capacitor to be charged. Actuation of firing switch 173 energizes relay 209, thereby moving the contact thereof to interconnect capacitor 211 with resistor 207. This provides a discharge path for this capacitor through winding 205 and shunt 213. Transformer 201 couples the resulting pulse to electrodes 77 causing a short duration weld pulse to be conducted through the workpiece. Pulse weld amplifier 219 and voltage comparator 221 continuously monitor this pulse during a weld cycle, and if the pulse incipiently exceeds a preestablished level as determined by the setting of generator 223, these components provide a control signal to shunt 213 which varies the impedance characteristic thereof to bring the weld pulse below this preestablished value. Relay 209 is then deenergized by the lifting of the weld electrode assembly and concurrent opening of switch 173; the contact thereof again interconnects capacitor 211 with point 212; and the cycle is completed.

The system of FIGURE 10 is shown schematically in FIGURE 11 with like reference numerals representing corresponding parts. In addition to the shunt 213 which is shown as comprising a transistor 227 having a resistance 229 connected in its emitter circuit, the primary winding 205 has connected across it a transient-suppressing diode 231 and a Zener diode 233. Pulse weld amplifier 219 is illustrated as comprising a pair of transistors 235 and 237 interconnected to the welding tips 77 by means of a coupling capacitor 239 and a resistance biasing network comprising resistors 241 and 243. The output of this amplifier is taken across an output resistance 244 interconnected between the collector of transistor 237 and the negative terminal of a 12 v. D.C. power supply indicated at 246. It will be appreciated that the second stage of this D.C. amplifier functions as an emitter follower to provide a low impedance output to the input of the voltage comparator.

The voltage comparator 221 consists of a pair of interconnected transistors 245 and 247 forming a differential amplifier circuit. The base of transistor 245 constitutes one input to the voltage comparator interconnected with the output of the D.C. amplifier, while the base of transistor 247 is connected to the rotor or tap of a potentiometer 249 which constitutes the reference voltage generator 223. The fixed resistance of potentiometer 249 is interconnected by means of a resistance 251 and a second resistance 253 across the terminals of power supply 246. The right side of the differential amplifier, i.e. transistor 247, is driven into conduction by the reference voltage, and the left side remains nonconducting as long as the output of the weld pulse amplifier does not exceed the preestablished value.

When this output exceeds the reference voltage, transistor 245 conducts, causing an output or error signal to appear at the collector of transistor 245. The output is applied to the input of the error amplifier which comprises two transistors 255 and 257 with an emitter follower stage 259 in the output. The output of this error amplifier, taken at the emitter of transistor 259, is coupled to the base or control electrode of the shunt transistor 227 to control its conductivity and thereby control the level of the pulse applied from the capacitor 211 to the primary of the welding transformer 201.

It should be noted that while shunt 213 is illustrated as comprising a single transistor 227, a plurality of transistors having commonly connected bases could be employed to reduce individual collector currents.

In addition to the dynamic control of the weld pulse which takes place during a welding cycle, it is desirable in many instances to provide for a pre-resistance test, i.e., for a resistance measurement of the workpiece prior to the initiation of the welding cycle to determine whether the resistance of the workpiece is within a certain tolerance range preselected by the operator. It will be understood that if the resistance is outside of this range, no matter how accurate the dynamic control is, a satisfactory weld joint cannot be assured. It is also desirable to conduct a post-resistance test subsequent to the weld cycle to determine whether the resistance characteristics of the workpiece indicate a satisfactory weld joint.

The system of FIGURE 12 includes components for performing both a pre-resistance test to determine whether the weld should be carried out upon impression of the proper pressure between the weld tips and the workpiece, and a post-resistance test to determine whether the resistance of the weld joint after a welding cycle is within a preselected range of values.

The system of FIGURE 12 includes all of the components illustrated in FIGURE 11, which components provide identical functions in this FIGURE 12 system. In addition to these, the FIGURE 12 system includes a test current generator 261 which operates at a relatively high frequency, for example, 25 kc. The output of this generator is connected across the weld tips 77, for example by connection to the bus bars 177 (see FIGURES 1 and 2). The leads 101, in addition to being interconnected to the input of the weld pulse amplifier 219, are connected with the input of an amplifier 263. This is a loosely tuned amplifier operative in the 25 kc. operating region. The output of amplifier 263 is applied to a detector 265, for example, a conventional full-wave bridge-type detector, which supplies a D.C. output voltage proportional to the amplitude level of the 25 kc. signal applied from amplifier 263. The output of detector 265 is in turn coupled to the respective inputs of two Schmitt trigger circuits 267 and 268. The former forms a part of the pre-resistance control; while the latter functions to carry out a post-resistance comparison. A D.C. reference voltage from a source 269 is applied to the second input of trigger circuit 267. Similarly, the second input of circuit 268 receives a D.C. reference voltage from a generator 270. The output of circuit 267 is applied to the coil of a relay 271. This relay has a first set of contacts 271a and a second set of contacts 271b, the latter being interconnected with a relay power supply 273 and the coil of relay 209. The weld firing switch 173 is shown as having its movable contact interconnected with power supply 273, one pole being connected to the coil of relay 209 and the other pole connected to a valve-holding relay 275. The movable contact of relay 275 is connected to a post-weld test relay 277, the coil of which is selectively energized by the output of trigger circuit 268. The movable arm of relay 277 and the arm of contacts 271a are connected to a 25 v. D.C. source connected at point 279.

When employed in the FIGURE 12 system, pulse weld amplifier 219 includes a low-pass filter in its input stage to block the 25 kc. signal from generator 261. It will be appreciated that the primary winding 203 presents a high impedance, for all practical purposes, to this 25 kc. signal.

In the FIGURE 12 system, a solenoid actuated valve 281 is connected in hydraulic pressure line 145 between the hydraulic cylinder 125 and cylinder 11. This valve is controlled by solenoid 283 whereby when this solenoid is energized the valve closes thereby blocking all motion of the foot pedal 113 or the vertically movable bracket 21 which carries the weld electrodes 77.

Operation of the FIGURE 12 system is as follows: Initially solenoid 283 is deenergized and a welding cycle is initiated by the depression of foot pedal 109 which brings weld electrodes into contact with the workpiece. Upon a predetermined pressure between the electrodes and the workpiece, the weld firing switch 173 is actuated as explained above. A weld cycle is thereby initiated, and as explained above in connection with FIGURE 10, the feedback circuit consisting of pulse weld amplifier 219, the voltage comparator 221 and error amplifier 225 function to flatten out or clip the pulse applied to the workpiece to maintain the voltage across the workpiece at a preestablished level. Before a weld is initiated, however, the pre-resistance welding test serves to prevent a weld cycle altogether if proper resistance characteristics are not exhibited by the workpiece. The test current generator 261 functions as a constant current source to supply a constant current at 25 kc. to the workpiece. The voltage across this workpiece (which is a function of the resistance thereof is applied to the input of amplifier 263 where it is amplified, and the resulting signal detected by detector 265. The output of the detector is coupled to the input of a Schmitt trigger circuit 267. This circuit functions to compare this input with the threshold level from generator 269, and if the input is too high (indicating an excessive resistance between the weld tips) the trigger circuit provides an output which energizes the coil of relay 271. This in turn actuates contacts 271b to open the weld fire circuit, thereby preventing energization of the coil of relay 209. As a result actuation of the contact of relay 209 is prevented and a weld cycle cannot be initiated. This signals the operator that the resistance characteristics of the workpiece are such that a satisfactory weld joint cannot be assured. The operator can then take whatever corrective action may be necessary.

Actuation of weld firing switch 173, in addition to initiating a welding cycle, also causes deenergization of relay 275, thereby permitting the contact thereof to return to the position illustrated in FIGURE 12. This completes a circuit from point 279 through the contacts of relay 277 (and also through contacts 271a of relay 271), through the now-closed contact of relay 275 to coil 283. This energizes the latter, closes valve 281 and thereby locks the weld electrodes 77 in their lower position.

The gap resistance, i.e. the resistance across the workpiece, increases appreciably upon welding, for example to a value which is double the pre-weld gap resistance. The post-weld resistance test provides a determination (1) whether this increase in resistance has occurred, and (2) whether the post-weld resistance is still below a preselected value, indicating a satisfactory weld. Unless both conditions (1) and (2) are satisfied, solenoid 283 remains energized, indicating an unsatisfactory weld.

To determine whether condition (1) is satisfied, trigger circuit 267 is again brought into play. If the resistance after the weld exceeds the level set in by reference voltage generator 269, trigger circuit 267 will, as before, energize relay 271 and actuate contacts 271a to open one of the conductive paths between point 279 and the movable contact of relay 275. If the post-weld resistance is above a level established by the setting of generator 270, trigger circuit 268 will apply an output signal to relay 277. This indicates that condition (2) is not satisfied. Energization of relay 277 maintains coil 283 energized through the contacts of relay 275. However, if the post-weld resistance is less than the value established by generator 270 (i.e., if condition (2) is satisfied), relay 277 will not be energized and the second or remaining conductive path between point 279 and relay contacts 275 will be opened. This in turn deenergizes coil 283, opening valve 281 and thereby permitting bracket 21 to move upward, positioning electrodes 77 in their upper position. Concurrently, switch 173 is actuated to the position illustrated in FIGURE 12. This reenergizes relay 275 drawing the movable arm out of circuit-closing relation with coil 283.

Summarizing, after initiation of a weld cycle, valve 281 is closed and is automatically reopened only if the post-weld resistance is (1) greater than the preresistance maximum level as established by the setting of generator 269, and (2) less than a level established by the adjustment of generator 270. Valve 281 is provided with a manual override to permit manual opening of the valve in the event of the post-weld resistance does not satisfy conditions (1) and (2) above.

In the system of FIGURE 12, a first voltmeter V1 is shown interconnected at the output of the reference voltage generator 223. This meter provides a means of selecting a proper clipping level or top to the welding pulse, i.e., a preselected maximum voltage level for the welding pulse. A second meter V2 is selectively interconnected by means of a three-position switch either to the output of detector 265, or the output of the threshold level generators 269 or 270. In addition to providing a means of accurately selecting the respective threshold levels set in by generators 269 and 270, this meter provides a reading of the resistance exhibited by the workpiece between the weld tips 77, both during the pre-resistance and the post-resistance test.

In view of the above, it will be seen that the several objects of the invention are achieved and other advantageous results attained.

As various changes could be made in the above constructions and circuits without departing from the scope of the invention, it is intended that all matter contained in the above description or shown in the accompanying drawings shall be interpreted as illustrative and not in a limiting sense.

What is claimed is:

1. A step welder comprising a first guide, a carrier movable on said guide, a pair of guide means on the carrier, arms oppositely movable on said guide means, each of said arms being adapted to carry an electrode device to and from work to be welded, a compensating device on said carrier having means articulated with said arms respectively to effect opposite relative movements thereof when the carrier is advanced on said first guide and one of the electrode devices contacts a portion of work in one plane, whereby the other electrode device advances to contact a portion of work in another plane, expansible fluid chamber means having relatively movable first and second parts, the first of which is connected to the carrier to move it toward engagement of the electrode devices with the work, the second of which parts is articulated with a reaction member to be held by it and to move it, means biasing the reaction member normally to prevent such movement, means for forcing fluid into the chamber of said expansible chamber means first to move said first part for engagement of the electrode devices with the work and then by reaction to move said second part to actuate the reaction member, an electric circuit including the electrode device and the work, a switch in the circuit, and means connecting the reaction member and the switch to close the circuit when the reaction member is actuated a certain amount in accordance with contact reaction pressure between the electrode devices and the work.

2. A welder comprising a framework including a work support, guide means on the work support, a movable electrode holder on the guide means for movement of an electrode to and from work on the work support, means on the framework movably supporting a cylinder, a movable plunger in the cylinder dividing it into a pressure compartment and a compartment for a resilient return means, said cylinder being movable under preselected pressure in the pressure compartment, a driving connection between said plunger and said electrode holder, said resilient return means returning the plunger after driving of the holder to work engaging position of the electrode and reduction in said preselected pressure, a lever pivoted on the framework and engaging said cylinder, a spring, one end of which is attached to said lever, a rotatable screw carried by the framework, a nut driven by the screw, the other end of said spring being connected to said nut, and drive means for rotating said screw, whereby the nut may be moved to vary the force of said spring thereby variably to apply torque to said lever, and a firing switch in a circuit for firing the electrode, said lever having a switch-operating part for operating said firing switch in response to movement of said cylinder in response to said preselected pressure.

3. A welder comprising framework including a work support, guide means on the work support, a movable electrode holder on the guide means, said holder carrying an electrode for movement to and from the work support, means on the framework slidably supporting a first cylinder, a first movable plunger in the cylinder, a drive connection between said first plnger and said holder for driving the latter to engage the electrode with work, resilient return means for said first plunger, a second cylinder, a second manually operable plunger therein, a closed fluid connection between the second and first cylinders for driving the first plunger from the second plunger against reaction of said resilient return means and to move the electrode means against the work and then reactively to drive the first cylinder, a lever pivoted on the frmework and engaging said first cylinder, a spring, one end of which is attached to said lever, a rotatable screw carried by the framework, a nut driven by the screw, the other end of said spring being connected to said nut, and drive means for rotating said screw, whereby the nut may be moved to vary the force of said spring thereby variably to apply torque to said lever, and a firing switch in a circuit for firing the electrodes, said lever having a switch-operating part for operating said firing switch in response to movement of the second cylinder.

4. A welder according to claim 3, wherein the engagement between the pivoted lever and the first cylinder is at one radius on the lever and the attachment of said spring is at a larger radius on the lever.

5. A welder according to claim 4, wherein each of said plungers is in the form of a flexible diaphragm.

6. A welder according to claim 5, wherein said drive connection includes a rod in the first cylinder extending from the first plunger and out of said first cylinder, said resilient return means being in the form of a compression coil spring surrounding said rod in said first cylinder.

7. A welder according to claim 6, wherein said drive means for rotating said screw includes a calibrated rotatable knob and a gear train connecting said knob and the screw.

References Cited by the Examiner
UNITED STATES PATENTS

| | | | |
|---|---|---|---|
| 1,988,537 | 1/35 | Breguet | 219—86 |
| 2,244,508 | 6/41 | Von Henke et al. | 219—89 |
| 2,859,330 | 11/58 | White | 219—89 |

RICHARD M. WOOD, *Primary Examiner.*